US011997664B2

(12) United States Patent
Bai et al.

(10) Patent No.: US 11,997,664 B2
(45) Date of Patent: May 28, 2024

(54) BEAM FAILURE DETECTION AND RECOVERY FOR HIGH PRIORITY OR BROADCAST CORESET

(71) Applicant: QUALCOMM Incorporated, San Diego, CA (US)

(72) Inventors: Tianyang Bai, Somerville, NJ (US); Tao Luo, San Diego, CA (US); Wooseok Nam, San Diego, CA (US); Sungwoo Park, Seoul (KR); Kiran Venugopal, Raritan, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 16/952,946

(22) Filed: Nov. 19, 2020

(65) Prior Publication Data

US 2021/0160842 A1 May 27, 2021

Related U.S. Application Data

(60) Provisional application No. 62/940,678, filed on Nov. 26, 2019.

(51) Int. Cl.
*H04W 72/044* (2023.01)
*H04B 7/0413* (2017.01)

(52) U.S. Cl.
CPC ........ *H04W 72/046* (2013.01); *H04B 7/0413* (2013.01)

(58) Field of Classification Search
None
See application file for complete search history.

(56) References Cited

U.S. PATENT DOCUMENTS

2017/0012692 A1* 1/2017 Kim ................. H04B 7/063
2019/0081691 A1* 3/2019 Nagaraja .......... H04W 72/08
(Continued)

OTHER PUBLICATIONS

3GPP TSG RAN WG1 Meeting #92, Athens, Greece, Feb. 26-Mar. 2, 2018 (Year: 2018).*

(Continued)

*Primary Examiner* — Jeffrey M Rutkowski
*Assistant Examiner* — Luna Weissberger
(74) *Attorney, Agent, or Firm* — QUALCOMM Incorporated

(57) ABSTRACT

Discussed is wireless communication that includes beam failure detection and recovery for high priority or broadcast CORESETs performed in wireless communication systems to effectuate an overall improvement in wireless communication. In some aspects, a mobile device may monitor one or more first reference signals associated with wireless communication performed using one or more first reception beams. The mobile device may also monitor one or more second reference signals associated with wireless communication performed using one or more second reception beams. The mobile device may detect a failure in wireless communication performed using the one or more first reception beams based, at least in part, on the monitoring of the one or more first reference signals. The mobile device may also initiate a beam failure recovery procedure for the one or more first reception beams upon detecting the failure in wireless communication performed using the one or more first reception beams.

30 Claims, 9 Drawing Sheets

(56) References Cited

U.S. PATENT DOCUMENTS

| | | | |
|---|---|---|---|
| 2019/0190582 A1 | 6/2019 | Guo et al. | |
| 2019/0215820 A1 | 7/2019 | Cirik et al. | |
| 2019/0253941 A1 | 8/2019 | Cirik et al. | |
| 2019/0357291 A1* | 11/2019 | Zhou | H04W 72/23 |
| 2020/0137821 A1* | 4/2020 | Cirik | H04W 76/19 |
| 2020/0259546 A1* | 8/2020 | Yang | H04W 16/28 |

OTHER PUBLICATIONS

International Search Report and Written Opinion—PCT/US2020/061478—ISA/EPO—dated Mar. 15, 2021.

* cited by examiner

BEAM FAILURE DETECTION AND RECOVERY FOR HIGH PRIORITY OR BROADCAST CORESET

CROSS-REFERENCE TO RELATED APPLICATIONS

This application claims the benefit of and priority to U.S. Provisional Patent Application No. 62/940,678, entitled "BEAM FAILURE DETECTION AND RECOVERY FOR HIGH PRIORITY OR BROADCAST CORESET," filed on Nov. 26, 2019, which is expressly incorporated herein by reference as if fully set forth below in its entirety and for all applicable purposes.

BACKGROUND

Field

Aspects of the present disclosure relate generally to wireless communication systems, and more particularly, to beam failure detection and recovery for high priority or broadcast CORESETs performed in wireless communication systems to effectuate an overall improvement in wireless communication. Certain aspects of the technology discussed below can enable and provide enhanced communication features and techniques for communication systems, including higher data rates, higher capacity, better spectral efficiency, lower latency, higher reliability, better coverage, and lower device power.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is disclosed. For example, a method can include monitoring, by a processor, one or more first reference signals associated with wireless communication performed using one or more first reception beams. The method can also include monitoring, by the processor, one or more second reference signals associated with wireless communication performed using one or more second reception beams. The method can further include detecting, by the processor, a failure in wireless communication performed using the one or more first reception beams based, at least in part, on the monitoring of the one or more first reference signals. The method can also include initiating, by the processor, a beam failure recovery procedure for the one or more first reception beams upon detecting the failure in wireless communication performed using the one or more first reception beams.

In an additional aspect of the disclosure, an apparatus configured for wireless communication is disclosed. For example, the apparatus can include means for monitoring one or more first reference signals associated with wireless communication performed using one or more first reception beams. The apparats can also include means for monitoring one or more second reference signals associated with wireless communication performed using one or more second reception beams. The apparatus can further include means for detecting a failure in wireless communication performed using the one or more first reception beams based, at least in part, on the monitoring of the one or more first reference signals. The apparatus can also include means for initiating a beam failure recovery procedure for the one or more first reception beams upon detecting the failure in wireless communication performed using the one or more first reception beams.

In an additional aspect of the disclosure, a non-transitory computer-readable medium having program code recorded thereon. The program code can include program code executable by a computer for causing the computer to monitor one or more first reference signals associated with wireless communication performed using one or more first reception beams. The program code can also include program code executable by a computer for causing the computer to monitor one or more second reference signals associated with wireless communication performed using one or more second reception beams. The program code can further include program code executable by a computer for causing the computer to detect a failure in wireless communication performed using the one or more first reception beams based, at least in part, on the monitoring of the one or more first reference signals. The program code can also include program code executable by a computer for causing the computer to initiate a beam failure recovery procedure for the one or more first reception beams upon detecting the failure in wireless communication performed using the one or more first reception beams.

In an additional aspect of the disclosure, an apparatus configured for wireless communication is disclosed. The apparatus includes at least one processor, and a memory coupled to the processor. The processor can be configured to monitor one or more first reference signals associated with wireless communication performed using one or more first reception beams. The processor can also be configured to monitor one or more second reference signals associated with wireless communication performed using one or more second reception beams. The processor can be further configured to detect a failure in wireless communication performed using the one or more first reception beams based, at least in part, on the monitoring of the one or more first reference signals. The processor can also be configured to initiate a beam failure recovery procedure for the one or more first reception beams upon detecting the failure in wireless communication performed using the one or more first reception beams.

In one aspect of the disclosure, a method of wireless communication is disclosed. For example, a method can include receiving, by a processor, from a mobile device, a first indication of a failure in wireless communication performed using one or more first reception beams. The method can also include receiving, by the processor, from the mobile device, a second indication, different than the first indication, of a failure in wireless communication performed using one or more second reception beams.

In an additional aspect of the disclosure, an apparatus configured for wireless communication is disclosed. For example, the apparatus can include means for receiving from a mobile device, a first indication of a failure in wireless communication performed using one or more first reception beams. The apparatus can also include means for receiving from the mobile device, a second indication, different than the first indication, of a failure in wireless communication performed using one or more second reception beams.

In an additional aspect of the disclosure, a non-transitory computer-readable medium having program code recorded thereon. The program code can include program code executable by a computer for causing the computer to receive from a mobile device a first indication of a failure in wireless communication performed using one or more first reception beams. The program code can also include program code executable by a computer for causing the computer to receive from the mobile device a second indication, different than the first indication, of a failure in wireless communication performed using one or more second reception beams.

In an additional aspect of the disclosure, an apparatus configured for wireless communication is disclosed. The apparatus includes at least one processor, and a memory coupled to the processor. The processor can be configured to receive, from a mobile device, a first indication of a failure in wireless communication performed using one or more first reception beams. The processor can also be configured to receive, from the mobile device, a second indication, different than the first indication, of a failure in wireless communication performed using one or more second reception beams.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
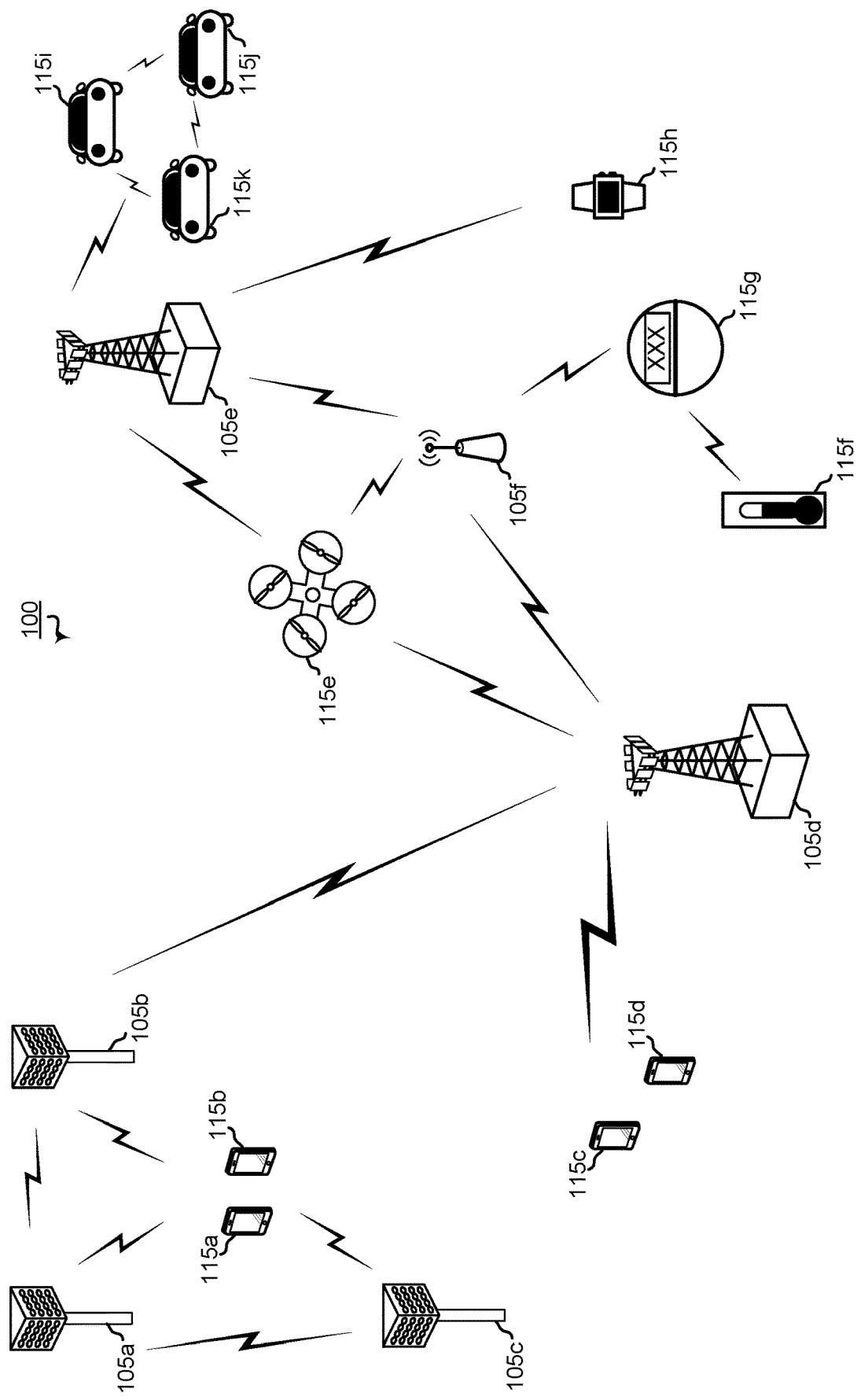
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
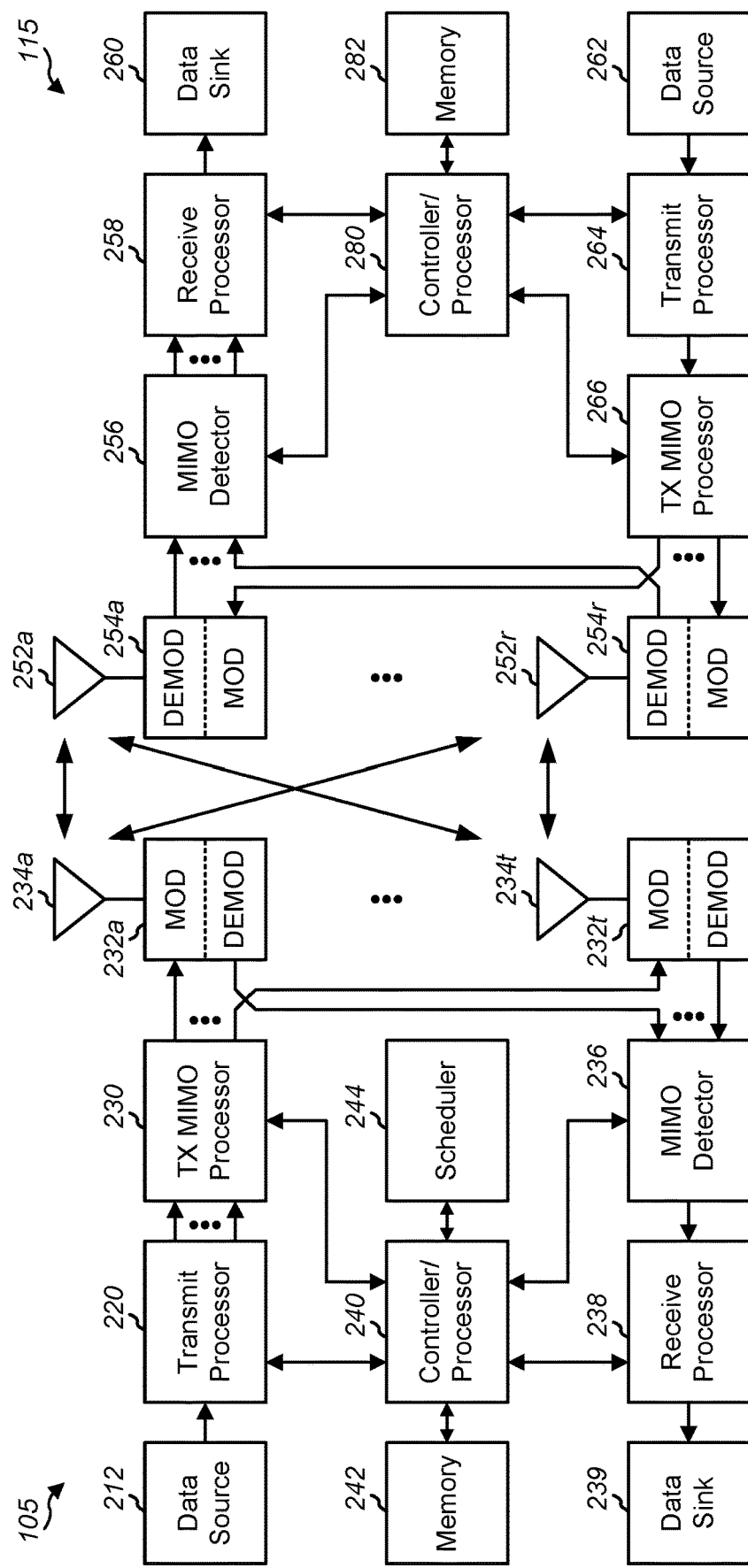
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DE- MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein, such as the process disclosed at FIG. 8. The controllers/processor 280 and/or other processors and modules at the UE 115 may also perform or direct the execution of the functional blocks illustrated in FIG. 6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
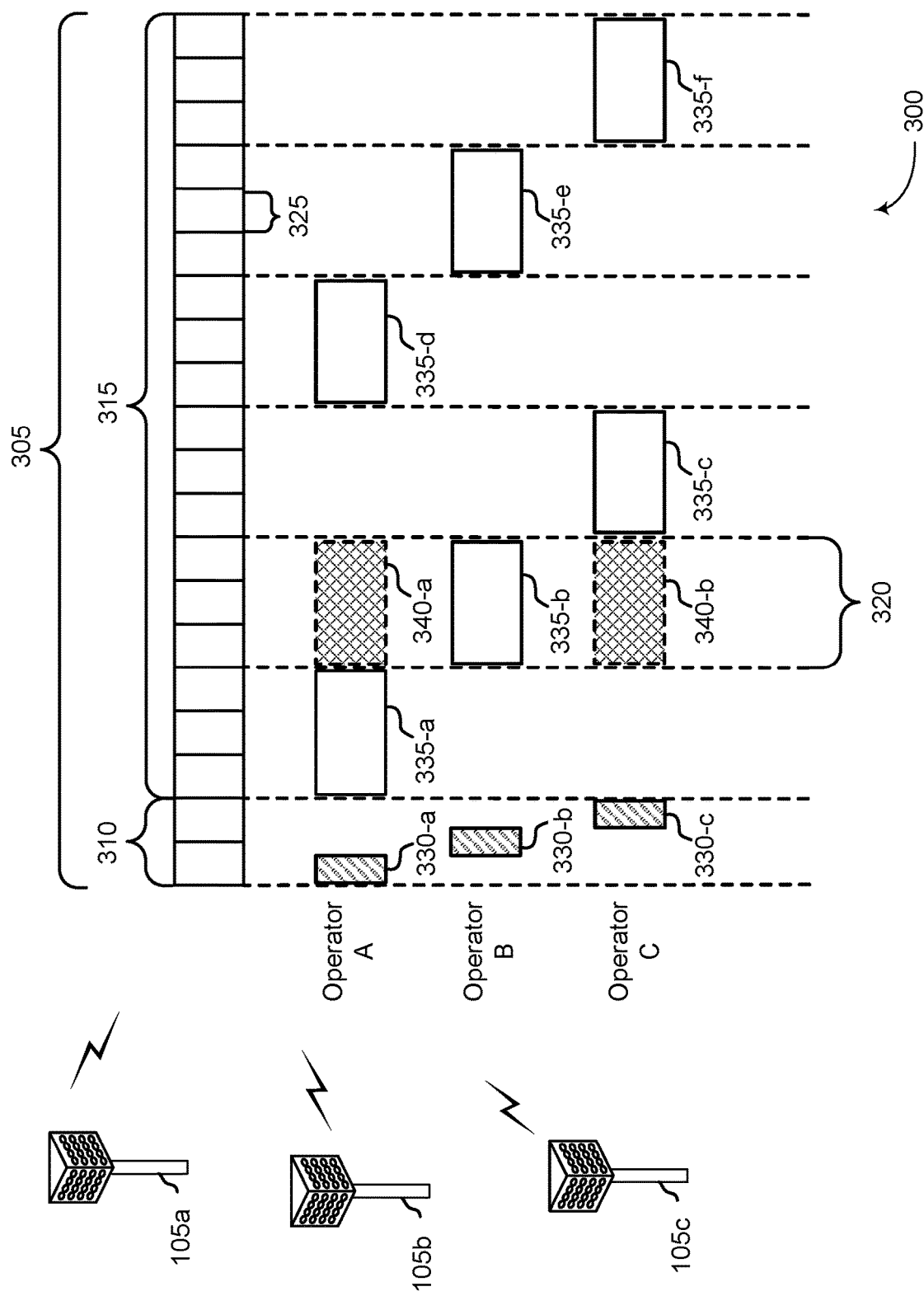
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

As illustrated in FIGS. 1-3, base stations and mobile devices may each be equipped with multiple antennas to transmit and/or receive information. In some aspects of the disclosure, base stations and mobile devices may use the multiple antennas for beamforming. Beamforming may refer to the configuring of multiple antennas to form a beam through which information may more efficiently and/or effectively be transmitted and/or received.

Figure 4:
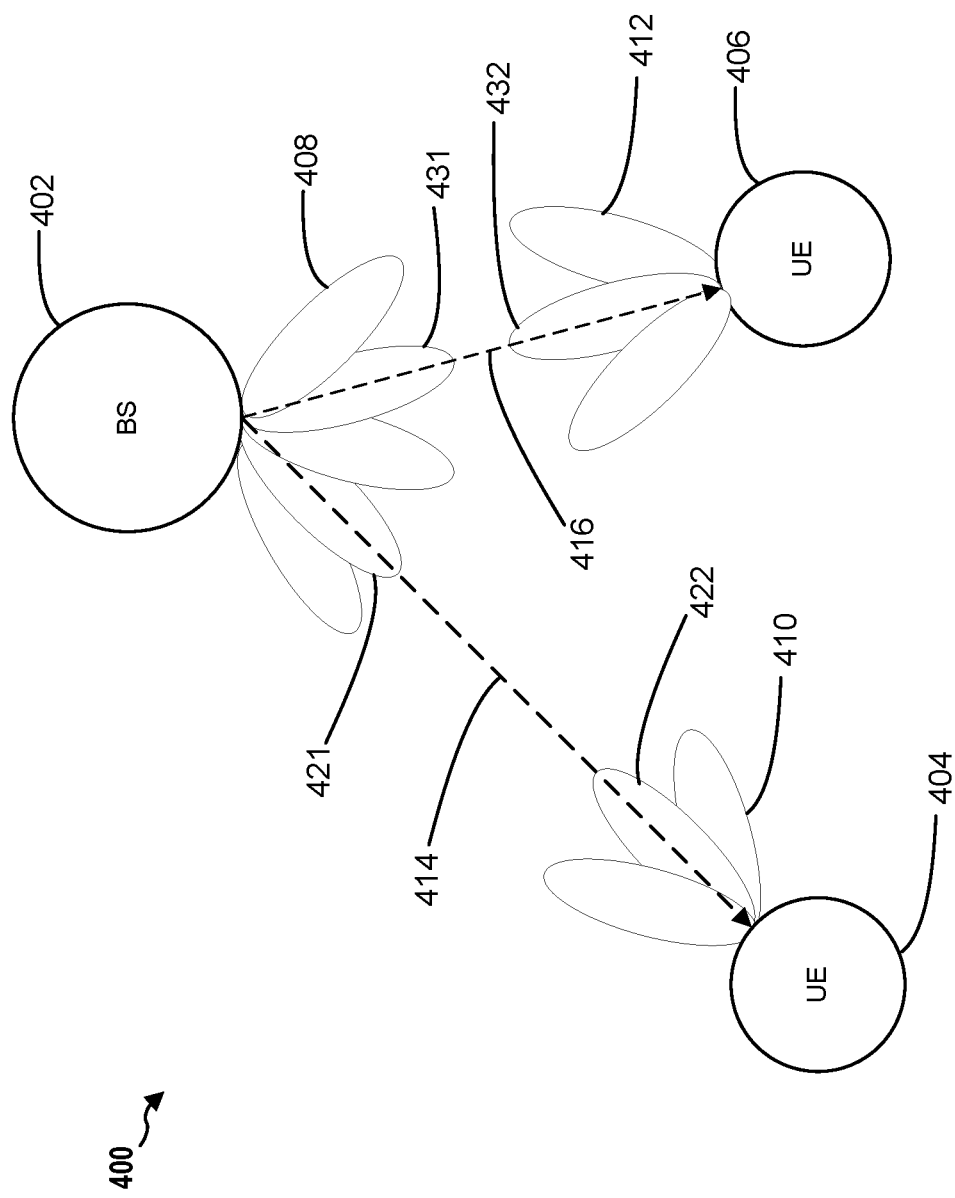
FIG. 4 is a diagram illustrating an example of wireless communication performed in a wireless communication system according to some aspects of the present disclosure.

FIG. 4 is a diagram illustrating an example of wireless communication performed in a wireless communication system according to some aspects of the present disclosure. In FIG. 4, a base station 402 communicates with a first mobile device 404 and a second mobile device 406 via different beams in different beamforming directions. As indicated by a set of beams 408, the base station 402 may communicate via any one of a plural of directional beams. As indicated by a set of beams 410, the first mobile device 404 may communicate via any one of a plural of directional beams. As indicated by a set of beams 412, the second mobile device 406 may communicate via any one of a plural of directional beams. Thus, at a given point in time, the base station 302 may communicate with the first mobile device 404 via a first beam in a first beamforming direction 414 and communicate with the second mobile device 406 via a second beam in a second beamforming direction 416. As illustrated in FIG. 4, the beamforming directions from the base station 402 to first mobile device 404 and the second mobile device 406 are distinct.

Figure 5:
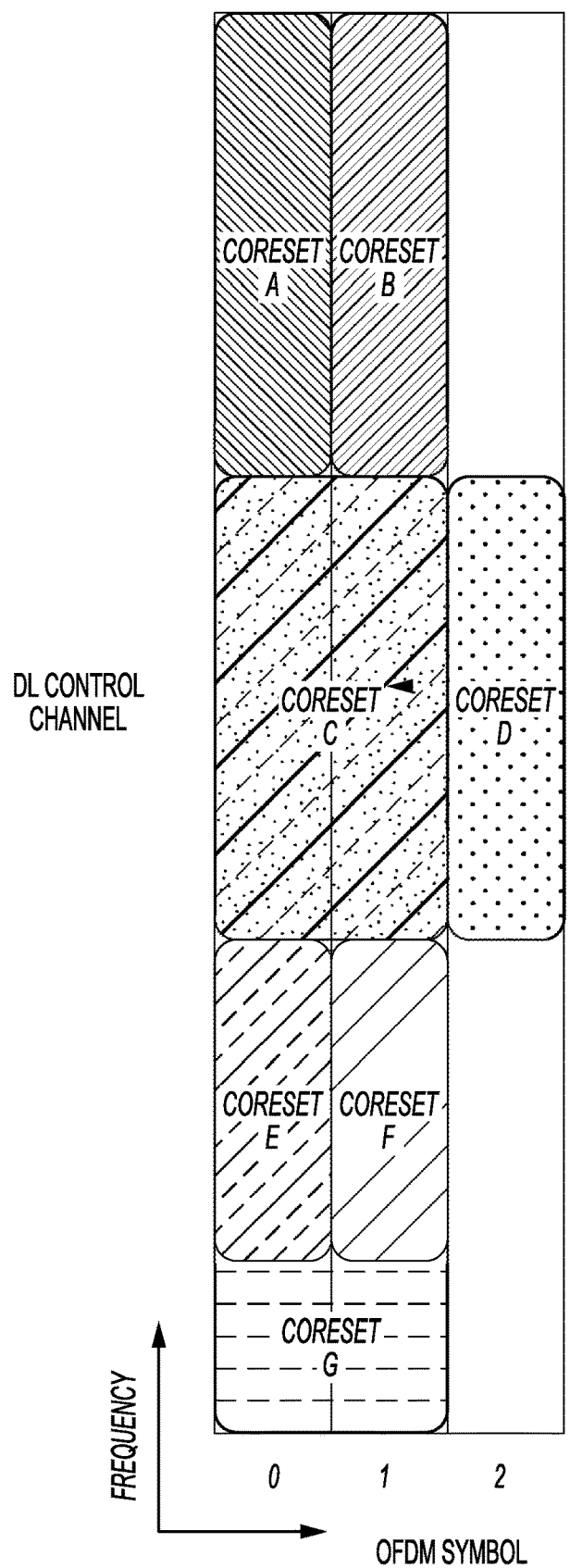
FIG. 5 shows a diagram that illustrates an example of the allocation of channel resources for CORESETs according to some aspects of the present disclosure.

According to some aspects of the present disclosure, a beam used for communication of control information, e.g., a beam used for the physical downlink control channel (PDCCH), may be referred to as a control resource set (CORESET). A CORESET may refer to a set of resource blocks in the frequency domain within which a mobile device may attempt to blindly decode downlink control information. According to some aspects of the present disclosure, the location of at least one CORESET may be obtained by a mobile device through a master information block (MIB), a physical broadcast channel (PBCH), and/or through implicit derivation from initial access communication. In some aspects of the present disclosure, the location of additional CORESETs may be obtained by a mobile device through radio resource control (RRC) signaling/communication. According to some aspects of the present disclosure, a mobile device may be informed by a gNB of both the transmission bandwidth for a CORESET and the transmission bandwidth of a channel state information reference signal (CSI-RS). In some aspects of the present disclosure, multiple CORESETs for a mobile device may be overlapped in time and/or frequency. According to some aspects of the present disclosure, a CORESET may span a time duration of one or more symbols. FIG. 5 shows a diagram that illustrates an example of the allocation of channel resources for CORESETs according to some aspects of the present disclosure.

In some aspects of the disclosure, a maximum number of resource blocks (RB_N_max) may be available to be allocated within a symbol for wireless communication of control information between a base station and a mobile device. According to some aspects of the disclosure, the frequencies associated with RB_N_max may specify the entire bandwidth that can be specified within a symbol and available for wireless communication of control information between a gNB and a mobile device within a symbol. According to some aspects of the disclosure, this bandwidth may be referred to as the component carrier (CC) bandwidth.

According to some aspects of the disclosure, the bandwidth associated with the entire number of frequency resources available to be allocated for the wireless communication of control information may be less than the CC bandwidth. In other words, the entire CC bandwidth is typically not available for wireless communication of control information. For example, in one aspect of the disclosure, the bandwidth associated with the entire number of frequency resources available for wireless communication of control information may be half the CC bandwidth such that the entire number of frequency resources available for wireless communication of control information may be half of RB_N_max. In another aspect of the disclosure, the bandwidth associated with the entire number of frequency resources available for wireless communication of control information may be one tenth of the CC bandwidth such that the entire number of frequency resources available for wireless communication of control information may be one tenth of RB_N_max. According to some aspects of the disclosure, this bandwidth associated with the entire number of frequency resources available for wireless communication of control information, i.e., the maximum bandwidth over which control information may be transmitted or received, may be referred to as a bandwidth part (BWP). Therefore, a CC bandwidth may include one or more BWPs. In some aspects of the disclosure, each BWP may be associated with a specific numerology, such as a specific subcarrier spacing, a specific frequency location, and/or a specific bandwidth. According to some aspects of the disclosure, the minimum bandwidth that a BWP may have may be the bandwidth needed for a synchronization signal.

According to some aspects of the disclosure, control information may be transmitted and/or received over a bandwidth that spans a BWP. In other aspects of the disclosure, control information may be transmitted and/or received over a bandwidth that spans a subset of a BWP, i.e., a subset of the number of frequency resources available for wireless communication of control information. In some aspects of the disclosure, a subset of the BWP that may be used for the wireless communication of control information may be referred to as a BWP subband. Accordingly, in some aspects of the disclosure, a BWP subband may be associated with frequency resources that yield a bandwidth smaller than a BWP. In other aspects of the disclosure, a BWP subband may be associated with frequency resources that yield a bandwidth as large as the BWP.

In some aspects of the present disclosure, a base station transmission beam and a corresponding mobile device reception beam used for downlink communication may be referred to as a downlink beam pair link (BPL). For example, one BPL illustrated in FIG. 4 may include BS transmission beam 421 and UE reception beam 422 associated with beamforming direction 414. Another BPL illustrated in FIG. 4 may include BS transmission beam 431 and UE reception beam 432 associated with beamforming direction 416. In some aspects of the present disclosure, a mobile device and a base station may be associated with multiple downlink and/or uplink BPLs. For example, as a mobile device moves in a network, a beam used by the mobile device for reception during downlink communication and a beam used by the base station for transmission during downlink communication may change and therefore establish other downlink BPLs between the base station and the mobile device.

To improve wireless communication reliability, a mobile device may be configured to perform beam failure detection (BFD) and beam failure recovery (BFR) procedures. For example, a mobile device may perform a BFD process to detect a failure in wireless communication performed using a beam and may perform a BFR process to identify another beam through which the mobile device may continue wireless communication, thereby recovering from the detected failure in wireless communication. Similarly, a base station may be configured to assist a mobile device in recovering from a failure in wireless communication performed using a beam, e.g., by informing the mobile device of one or more other beams that the mobile device can use for reliable communication.

Typically, a mobile device may utilize only one BFD/BFR procedure, and that single BFD/BFR procedure is typically associated with only beams used to communicate unicast information relevant to only that single mobile device. Similarly, a typical base station may handle only one BFD/BFR procedure associated with a mobile device, and that single BFD/BFR procedure is typically associated with only beams used to communicate unicast information. Thus, the overall reliability of wireless communication, which includes communication of more than just unicast information, is limited when only a single BFD/BFR procedure associated with only beams used to communicate unicast information is utilized.

Aspects of the present disclosure improve wireless communication reliability by utilizing at least two distinct BFD/BFR procedures. One BFD/BFR procedure may be associated with beams used to communicate unicast information. At least one other BFD/BFR procedure may be associated with beams used to communicate high-priority information or broadcast information. Both BFD/BFR procedures may operate in parallel and independent of each other. For example, one BFD/BFR procedure may be dedicated for beams used to communicate unicast information, and another different BFD/BFR procedure may be dedicated for beams used to communicate high-priority information or broadcast information.

Figure 6:
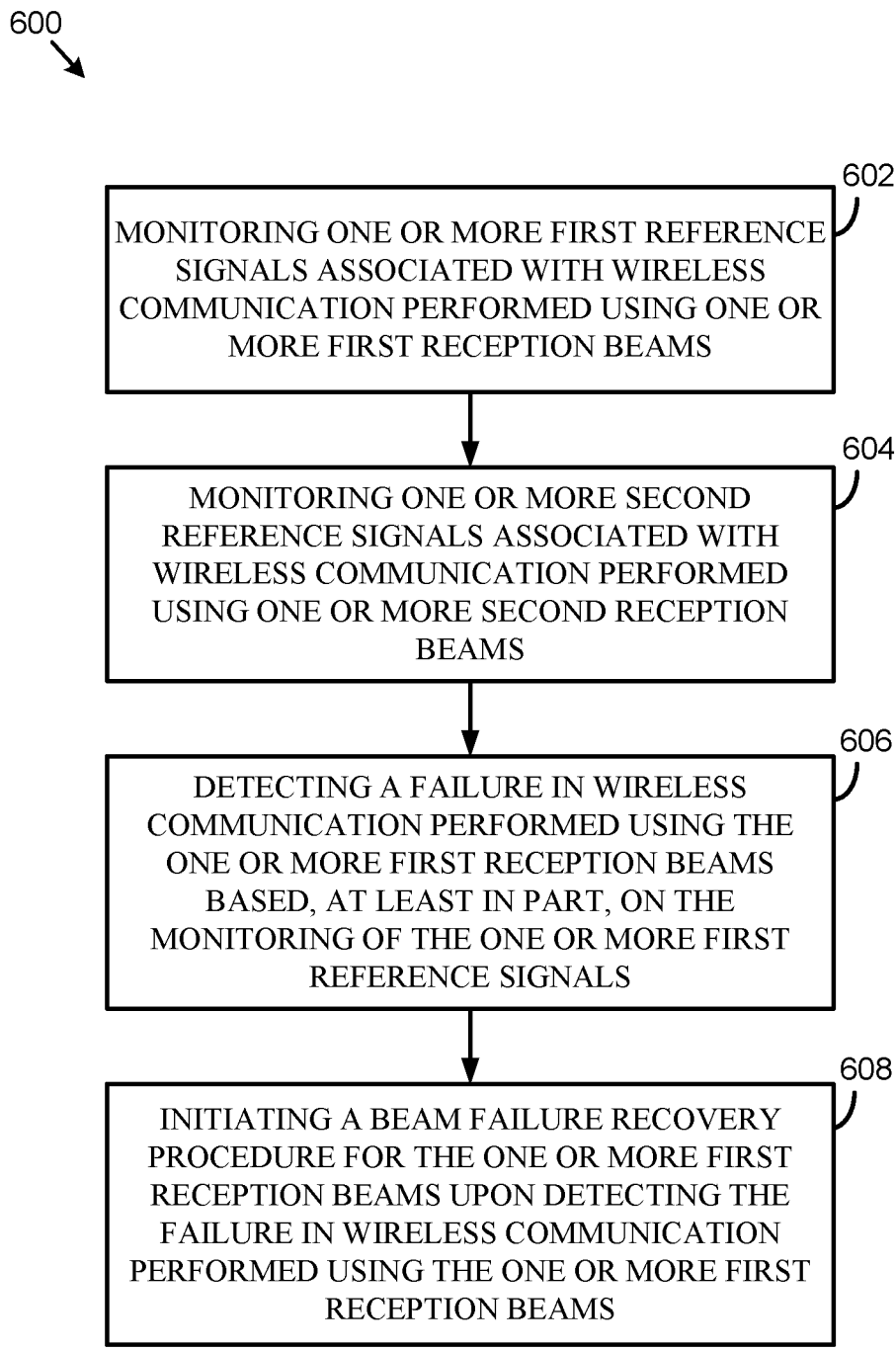
FIG. 6 is a block diagram illustrating a method for performing beam failure detection and recovery for high priority or broadcast CORESETs in a wireless communication system according to some aspects of the present disclosure.

FIG. 6 is a block diagram illustrating a method 600 for performing beam failure detection and recovery for high priority or broadcast CORESETs in a wireless communication system according to some aspects of the present disclosure. Aspects of method 600 may be implemented with the aspects of this disclosure described with respect to FIGS. 1-5, 7A, and 7B. For example, with reference to FIG. 2, controller/processor 280 of UE 115 may control UE 115 to perform the steps of method 600. Specifically, method 600 includes, at block 602, the step of monitoring, by a processor, one or more first reference signals associated with wireless communication performed using one or more first reception beams. At block 604, method 600 includes the step of monitoring, by the processor, one or more second reference signals associated with wireless communication performed using one or more second reception beams.

In some aspects of the disclosure, wireless communication performed using the one or more first reception beams may include reception, by a mobile device, of broadcast control information relevant to more than one mobile device, and wireless communication performed using the one or more second reception beams may include reception, by the mobile device, of unicast control information relevant to a single mobile device. In one aspect of the disclosure, unicast control information may refer to control information that has been scrambled, e.g., by a base station processor, with an identifier specific to a mobile device or an identifier specific to a user of the specific mobile device. Broadcast control information may refer to control information that has been scrambled, e.g., by a base station processor, with an identifier associated with a plurality of mobile devices, a plurality of users, or one or more base station cells. According to an aspect of the disclosure, the wireless communication performed using the one or more first reception beams or performed using the one or more second reception beams may refer to downlink communication of control information, e.g., control information sent by a base station in a PDCCH (CORESET) to a mobile device.

According to another aspect of the disclosure, wireless communication performed using the one or more first reception beams may include both reception, by the mobile device, of broadcast control information relevant to more than one mobile device and reception, by the mobile device, of unicast control information relevant to a single mobile device. For example, the same beam may be used by the mobile device to receive control information that includes broadcast and unicast control information.

In another aspect of the disclosure, wireless communication performed using the one or more first reception beams may include reception, by a mobile device, of priority information, e.g., information that may need to be received with high reliability and/or information that has a lower tolerance for failure. In one aspect of the disclosure, the priority information may be broadcast control information. In another aspect of the disclosure, the priority information may be unicast control information. Thus, in some aspects of the disclosure, wireless communication performed using the one or more first reception beams may include both reception, by the mobile device, of priority information and reception, by the mobile device, of unicast control information relevant to a single mobile device. For example, the same beam may be used by the mobile device to receive control information that includes priority and unicast control information.

In some aspects of the disclosure, wireless communication performed using the one or more first reception beams may include wireless communication within a first BWP. According to some aspects of the disclosure, wireless communication performed using the one or more second reception beams may include wireless communication within the first BWP, i.e., the same BWP used for the one or more first reception beams. In another aspect of the disclosure, wireless communication performed using the one or more second reception beams may include wireless communication within a second BWP, i.e., a BWP different than the BWP used for the one or more first reception beams.

In some aspects of the disclosure, wireless communication performed using the one or more first reception beams may include wireless communication within a first CC. According to some aspects of the disclosure, wireless communication performed using the one or more second reception beams may include wireless communication within the first CC, i.e., the same CC used for the one or more first reception beams. In another aspect of the disclosure, wireless communication performed using the one or more second reception beams may include wireless communication within a second CC, i.e., a CC different than the CC used for the one or more first reception beams.

According to some aspects of the disclosure, the one or more first reception beams used for wireless communication may be associated with one or more first reference signals. In one aspect of the disclosure, a mobile device may use the one or more first reference signals to determine whether communication using the one or more first reception beams is reliable or whether a failure in wireless communication using the one or more first reception beams has occurred such that a BFR procedure should be initiated.

As an example, once a mobile device and base station establish a particular group of one or more downlink BPLs to use for wireless communication, the base station may transmit reference signals, e.g., the one or more first reference signals, using one or more transmission beams from the group of downlink BPLs and the mobile device may receive the reference signals, e.g., the one or more first reference signals, using one or more reception beams from the group of downlink BPLs, e.g., the one or more first reception beams. Because the same beams used for wireless communication, e.g., the one or more first reception beams, are used for transmitting and receiving the associated reference signals, e.g., the one or more first reference signals, the mobile device may use the reference signals to determine the quality of the wireless communication using the beams. Thus, a mobile device may monitor one or more properties of the one or more first reference signals, e.g., signal power, to determine whether communication using the one or more first reception beams is reliable or whether a failure in wireless communication using the one or more first reception beams has occurred such that a BFR procedure should be initiated.

In some aspects of the disclosure, a reference signal of the one or more first reference signals may be a CSI-RS and/or a synchronization signal block (SSB). According to one aspect of the disclosure, the one or more first reference signals may be transmitted and/or received less often than the broadcast and/or priority information is transmitted and/or received using the one or more first reception beams.

According to one aspect of the disclosure, a first reception beam of the one or more first reception beams may be associated with one first reference signal of the one or more first reference signals. In another aspect of the disclosure, a first reception beam of the one or more first reception beams may be associated with multiple first reference signals of the one or more first reference signals. According to another aspect of the disclosure, multiple first reception beams of the one or more first reception beams may be associated with the same one or more first reference signals.

The relationship between the one or more second reception beams used for wireless communication, e.g., those beams used for communication of unicast information, and the one or more second reference signals is the same as the relationship that was described in the preceding paragraphs between the one or more first reception beams used for wireless communication and the one or more first reference signals. Accordingly, one of skill in the art would readily recognize that the description in the preceding paragraphs of the first reference signals and of the relationship between the one or more first reception beams and the one or more first reference signals also describes the properties of the second reference signals and the relationship between the one or more second reception beams and the one or more second reference signals.

According to some aspects of the disclosure, the one or more first reception beams may have different frequency and/or time resources than the one or more second reception beams. For example, in some aspects, the one or more first reception beams and the one or more second reception beams may be associated with different CORESETs. In other words, the frequency, time, or both the frequency and time resources allocated for the one or more first reception beams may be different than the frequency, time, or both the frequency and time resources allocated for the one or more second reception beams. Accordingly, in some aspects of the disclosure, the beams used for communicating broadcast or priority information may be allocated different frequency and/or time resources than the beams used for communicating unicast information. In such an aspect of the disclosure, the beams used for communicating unicast information may not be reused to communicate broadcast or priority information.

In some aspects of the disclosure, the one or more first reception beams may have the same frequency and time resources as the one or more second reception beams. For example, in some aspects, the one or more first reception beams and the one or more second reception beams may be associated with the same CORESET. In other words, the frequency, time, or both the frequency and time resources allocated for the one or more first reception beams may be the same as the frequency, time, or both the frequency and time resources allocated for the one or more second reception beams. Accordingly, in some aspects of the disclosure, the beams used for communicating broadcast or priority information may be allocated the same frequency and/or time resources as the beams used for communicating unicast information. In such an aspect of the disclosure, the beams used for communicating unicast information may also be used or may be reused to communicate broadcast or priority information.

Method 600 also includes, at block 606, the step of detecting, by the processor, a failure in wireless communication performed using the one or more first reception beams based, at least in part, on the monitoring of the one or more first reference signals. At block 608, method 600 includes the step of initiating, by the processor, a beam failure recovery procedure for the one or more first reception beams upon detecting the failure in wireless communication performed using the one or more first reception beams. According to some aspects of the disclosure, the steps at blocks 602 through 606 may be part of a BFD process and the step at block 608 may be part of a BFR process.

Figure 7A:
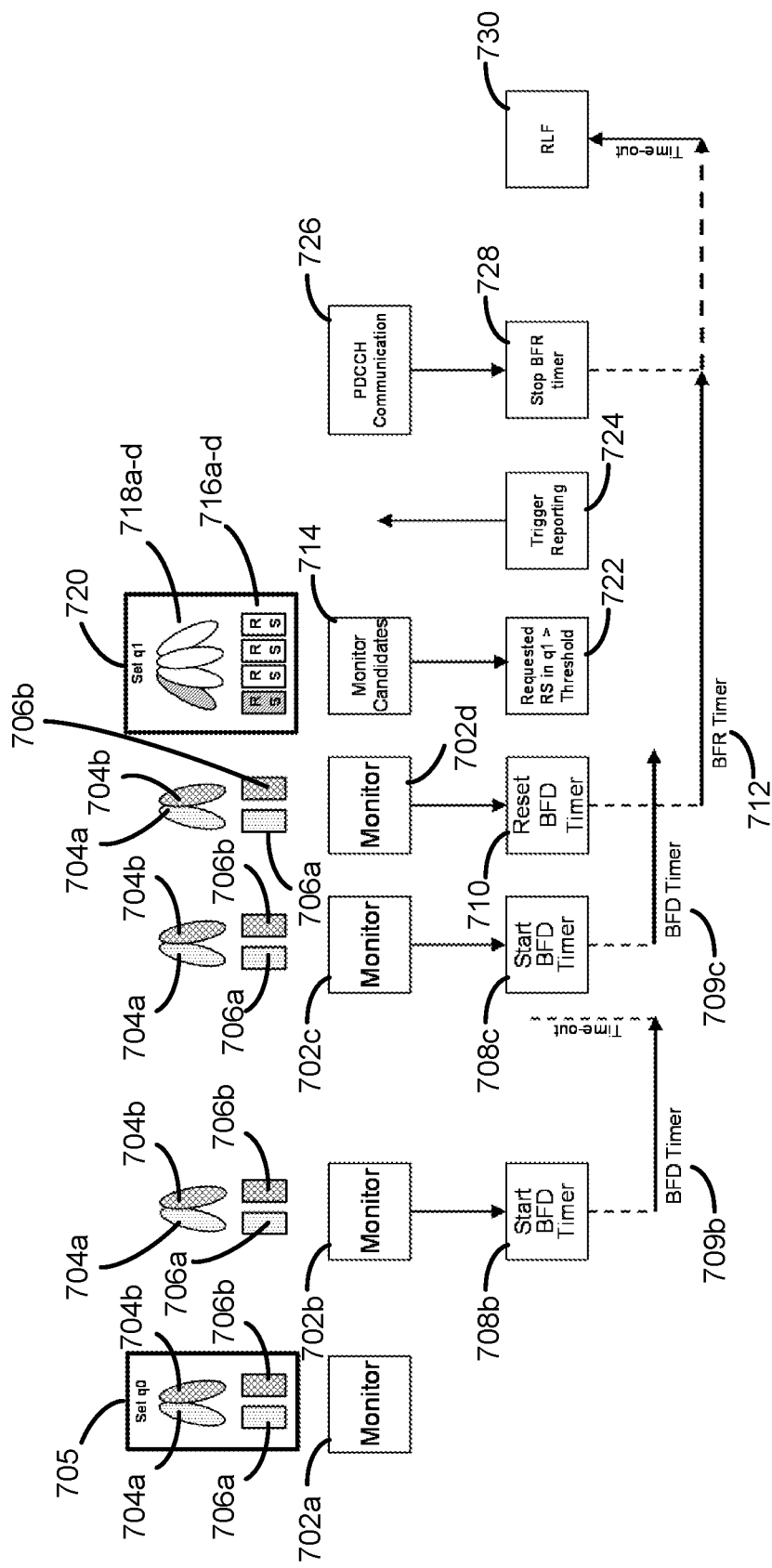
FIG. 7A is a diagram illustrating an example of BFD and BFR performed in a wireless communication system according to some aspects of the present disclosure.

FIG. 7A is a diagram illustrating an example of BFD and BFR performed in a wireless communication system according to some aspects of the present disclosure. At block 702, a mobile device may monitor one or more first reference signals associated with wireless communication performed using one or more first reception beams. Such monitoring may correspond to the monitoring performed at block 602 of method 600. For example, the previously-described one or more first reception beams may correspond to the one or more first reception beams made up of first reception beams 704a and 704b. Similarly, the previously-described one or more first reference signals may correspond to the one or more first reference signals made up of first reference signals 706a and 706b. Thus, block 705 may represent a first group of one or more first reception beams 704 that can be used for wireless communication and their associated one or more first reference signals 706. In some aspects, the one or more first reference signals 706 may be dedicated for monitoring the one or more first reception beams 704.

Monitoring, such as at block 702, may include the UE comparing the signal power, e.g., reference signal reference power (RSRP), of at least one of the one or more first reference signals 706 to a threshold, e.g., a RSRP threshold. In some aspects, the threshold may be dedicated for the BFD/BFR procedure associated with the one or more first reception beams 704 used to communicate high-priority information or broadcast information. Monitoring may also include other processing performed on the one or more first reference signals 706 to determine whether communication using the one or more first reception beams is reliable or whether a failure in wireless communication using the one or more first reception beams has occurred such that a BFR procedure should be initiated. As part of the monitoring performed at block 702, a mobile device may determine that a beam failure instance has occurred when the signal power of at least one of the one or more first reference signals 706 is below the threshold. As an example, at block 702a, the mobile device may process at least one of one of the one or more first reference signals 706 and determine that none of the one or more first reference signals 706 has a signal power that is below the threshold, and that therefore there was no beam failure instance. As a result of such processing at block 702a, the mobile device may not initiate any additional BFD or BFR processing and instead may wait for the next reception of one or more first reference signals 706 to again determine whether a beam failure instance has occurred.

When the mobile device determines that a beam failure instance has occurred, the mobile device may start a BFD timer. As an example, at block 702b, the mobile device may determine that one of the one or more first reference signals 706 has a signal power that is below the threshold, and that therefore a beam failure instance has occurred. At block 708b, the mobile device may start a first BFD timer 709b. If no other beam failure instance is detected before the first BFD timer 709b expires, then the mobile device may not initiate any additional BFD or BFR processing and instead may wait for the next reception of one or more first reference signals 706 to again determine whether a beam failure instance has occurred.

At block 702c, the mobile device may again determine that one of the one or more first reference signals 706 has a signal power that is below the threshold, and that therefore a beam failure instance has occurred. At block 708c, the mobile device may start a second BFD timer 709c. In some aspects, the BFD timers 709b and 709c may be dedicated for the BFD/BFR procedure associated with the one or more first reception beams used to communicate high-priority information or broadcast information. At block 702d, the mobile device may again determine that one of the one or more first reference signals 706 has a signal power that is below the threshold, and that therefore another beam failure instance has occurred. In FIG. 7A, the beam failure instance identified at block 702d may occur before the second BFD timer 709c has expired.

In some aspects of the disclosure, detecting a failure in wireless communication performed using the one or more first reception beams based, at least in part, on the monitoring of the one or more first reference signals, such as the detecting performed as part of the detecting step at block 606 of method 600, may include the mobile device detecting that a threshold number of beam failure instances have occurred before a BFD timer has expired. The threshold number of beam failure instances may be different for different types of mobile devices, different types of information being communicated, different types of communication systems, and/or for various other different factors.

In the aspect of the disclosure illustrated in FIG. 7A, the threshold number of beam failure instances is two. Therefore, at block 702d, the mobile device may detect, such as the detecting part of the detecting step at block 606 of method 600, that a failure in wireless communication performed using the one or more first reception beams 704 has occurred based on the monitoring of the one or more first reference signals 706, such as the monitoring performed at blocks 702. In particular, the mobile device may detect that a failure in wireless communication performed using the one or more first reception beams 704 has occurred because a first beam failure instance was detected during the monitoring performed at block 702c and a second beam failure instance was detected during the monitoring performed at block 702d, where the second beam failure instance was detected before the expiration of the second BFD timer 709c that was initiated as a result of the detected first beam failure instance.

At block 710, as a result of detecting, such as at block 702d, the failure in wireless communication performed using the one or more first reception beams 704, the mobile device may reset the second BFD timer 709c and initiate a BFR procedure for the one or more first reception beams 704. Therefore, initiating a BFR procedure for the one or more first reception beams 704 upon detecting the failure in wireless communication performed using the one or more first reception beams 704, such as the initiating performed as part of the initiating step at block 608 of method 600, may include the mobile device initiating a BFR procedure at block 710 upon detecting, such as at block 702d, the failure in wireless communication performed using the one or more first reception beams 704. In some aspects of the disclosure, initiating the BFR procedure, such as at block 608 of method 600, may include starting a BFR timer 712.

As part of the BFR procedure, the mobile device may attempt to determine whether there are candidate beams that can be used to restore wireless communication. For example, in FIG. 7A, at block 714, the mobile device may also monitor the properties of one or more candidate reference signals 716a-d associated with one or more candidate reception beams 718a-d. In some aspects, the one or more candidate reference signals 716a-d may be dedicated for monitoring the one or more candidate reception beams 718a-d. Thus, block 720 may represent a group of one or more candidate reception beams 718 that can be used for wireless communication and their associated one or more candidate reference signals 716. At block 714, the mobile device may compare the signal power of at least one of the one or more candidate reference signals 716 to a threshold, which may be the same or different than the threshold used as part of the monitoring of the one or more first reference signals 706. At block 722, the mobile device may determine that at least one of the one or more candidate reference signals 716 has a signal power that is not below the threshold.

At block 724, as part of the BFR procedure, the mobile device may transmit to a base station, and the base station may receive from the mobile device, an indication of the failure in wireless communication performed using the one or more first reception beams 704. For example, the indication may be included in a report sent by the mobile device to the base station. In some aspects of the disclosure, the mobile device may transmit the foregoing beam failure indication to the base station using an uplink transmission beam of the mobile device. According to some aspects, the uplink transmission beam may be associated with one or more second reception beams, such as the one or more second reception beams described with respect to FIG. 6. For example, in some aspects, the uplink transmission beam may be a beam used for unicast wireless communication, e.g., a beam that is used for wireless communication associated with unicast control information relevant to only the mobile device. According to another aspect of the disclosure, the mobile device may transmit the indication to the base station in a physical uplink control channel (PUCCH) allocated to the mobile device.

According to some aspects of the disclosure, at block 724, the mobile device may also transmit to the base station, and the base station may receive from the mobile device, along with the indication of the failure in wireless communication, an indication of one or more candidate beams 718 that can be used for wireless communication in place of the one or more first reception beams 704. For example, the indication of one or more candidate beams 718 that can be used for wireless communication in place of the one or more first reception beams 704 may be included in the same report that includes the beam failure indication.

At block 726, the mobile device may receive from a base station, and the base station may transmit to the mobile device, an indication of one or more other reception beams to use for wireless communication in place of the one or more first reception beams 704. In another aspect of the disclosure, at block 726, the mobile device may receive from the base station, and the base station may transmit to the mobile device, an indication to use the one or more candidate beams 718 for wireless communication in place of the one or more first reception beams 704. In yet another aspect of the disclosure, at block 726, the mobile device may receive from the base station, and the base station may transmit to the mobile device, an indication to use at least one of the one or more second reception beams for wireless communication in place of the one or more first reception beams 704. In other words, at block 726, the mobile device may receive from the base station an instruction to reuse unicast beams as broadcast or priority beams after initial beam failure associated with communication of broadcast or priority information is detected.

In some aspects of the disclosure, the mobile device may recover the wireless communication initially performed using the one or more first reception beams 704 by using reception beams identified at block 726. For example, in one aspect of the disclosure, the mobile device may recover the wireless communication initially performed using the one or more first reception beams 704 by using the one or more other reception beams for wireless communication in place of the one or more first reception beams 704. In another aspect of the disclosure, the mobile device may recover the wireless communication initially performed using the one or more first reception beams 704 by using the one or more candidate beams 718 for wireless communication in place of the one or more first reception beams 704. In yet another aspect of the disclosure, the mobile device may recover the wireless communication initially performed using the one or more first reception beams 704 by using the at least one of the one or more second reception beams for wireless communication in place of the one or more first reception beams 704. For example, in some aspects, the mobile device may use the indicated at least one of the one or more second reception beams to recover wireless communication associated with the one or more first reception beams before expiration of a timer associated with the beam failure recovery procedure for the one or more first reception beams, such as BFR timer 712. In some aspects, the BFD timer 712 may be dedicated for the BFD/BFR procedure associated with the one or more first reception beams used to communicate high-priority information or broadcast information.

At block 728, the mobile device may stop the BFR timer 712 upon receiving from the base station, such as at block 726, an indication of at least one beam that the mobile device can use to recover the failed wireless communication initially performed using the one or more first reception beams 704. At block 730, the mobile device may determine that a radio link failure (RLF) has occurred when the BFR timer 712 expires before the mobile device receives from the base station, such as at block 726, an indication of at least one beam that the mobile device can use to recover the failed wireless communication initially performed using the one or more first reception beams 704.

The foregoing BFD and BFR procedures illustrated in FIG. 7A and described with respect to FIG. 7A were described with respect to reception and processing of the one or more first reception beams and their associated one or more first reference signals. The same BFD and BFR procedures performed based on reception and processing of the one or more first reception beams and their associated one or more first reference signals are also performed based on reception and processing of the one or more second reception beams and their associated one or more second reference signals. In other words, the same BFD and BFR procedures performed based on reception and processing of the beams used for communication of broadcast and/or priority information and their associated one or more first reference signals are also performed based on reception and processing of the beams used for communication of unicast information and their associated one or more second reference signals. Accordingly, one of skill in the art would readily recognize that the description in the preceding paragraphs of the BFD and BFR operations illustrated in FIG. 7A and performed based on reception and processing of the one or more first reception beams and their associated one or more first reference signals also describes the BFD and BFR procedures performed based on reception and processing of the one or more second reception beams and their associated one or more second reference signals, with the reference to the first reception beams and first reference signals being replaced by reference to the second reception beams and second reference signals, respectively.

Figure 7B:
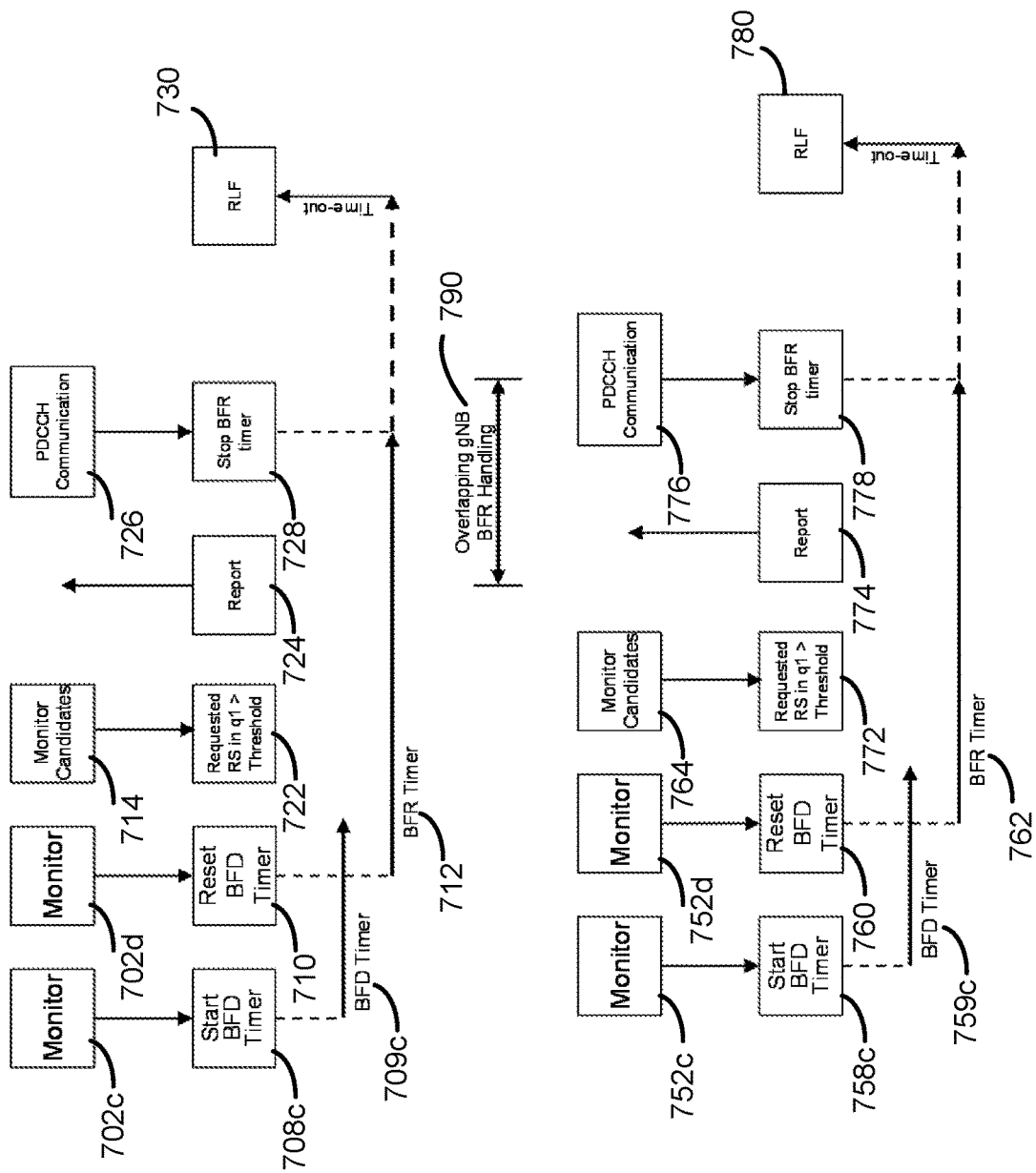
FIG. 7B is another diagram illustrating an example of BFD and BFR performed in a wireless communication system according to some aspects of the present disclosure.

As an example, FIG. 7B is another diagram illustrating an example of BFD and BFR performed in a wireless communication system according to some aspects of the present disclosure. FIG. 7B adds some of the BFD and BFR operations performed based on reception and processing of the beams used for communication of unicast information and their associated one or more second reference signals.

At block 752c, the mobile device may determine that one of the one or more second reference signals has a signal power, e.g., RSRP, that is below another threshold, e.g., another RSRP threshold, and that therefore a beam failure instance has occurred. For example, in some aspects, one or more second reference signals may be dedicated for monitoring one or more second reception beams. Additionally, in some aspects, the other threshold may be dedicated for the BFD/BFR procedure associated with the one or more second reception beams used to communicate unicast information. At block 758c, the mobile device may start a BFD timer 759c. In some aspects, the BFD timer 759c may be dedicated for the BFD/BFR procedure associated with the one or more second reception beams used to communicate unicast information. At block 752d, the mobile device may again determine that one of the one or more second reference signals has a signal power that is below the threshold, and that therefore another beam failure instance has occurred. In FIG. 7B, the beam failure instance identified at block 752d may occur before the BFD timer 759c has expired.

As before, the threshold number of beam failure instances may be different for different types of mobile devices, different types of information being communicated, different types of communication systems, and/or for various other different factors. In addition, the signal power threshold and the threshold number of beam failure instances used when processing the one or more second reference signals may be different than the signal power threshold and the threshold number of beam failure instances used when processing the one or more first reference signals.

In the aspect of the disclosure illustrated in FIG. 7B, the threshold number of beam failure instances when processing the one or more second reference signals is also two. Therefore, at block 752*d*, the mobile device may detect that a failure in wireless communication performed using the one or more second reception beams has occurred based on the monitoring of the one or more second reference signals, such as the monitoring performed at blocks 752. In particular, the mobile device may detect that a failure in wireless communication performed using the one or more second reception beams has occurred because a first beam failure instance was detected during the monitoring performed at block 752*c* and a second beam failure instance was detected during the monitoring performed at block 752*d*, where the second beam failure instance was detected before the expiration of the BFD timer 759*c* that was initiated as a result of the detected first beam failure instance.

At block 760, as a result of detecting, such as at block 752*d*, the failure in wireless communication performed using the one or more second reception beams, the mobile device may reset the BFD timer 759*c* and initiate a BFR procedure for the one or more second reception beams. Therefore, initiating a BFR procedure for the one or more second reception beams upon detecting the failure in wireless communication performed using the one or more second reception beams may include the mobile device initiating a BFR procedure at block 760 upon detecting, such as at block 752*d*, the failure in wireless communication performed using the one or more second reception beams. In some aspects of the disclosure, initiating the BFR procedure may also include starting a BFR timer 762. In some aspects, the BFD timer 762 may be dedicated for the BFD/BFR procedure associated with the one or more second reception beams used to communicate unicast information.

According to some aspects of the disclosure, the BFR procedure for the one or more second reception beams may be initiated at block 760 in addition to the initiation of the BFR procedure for the one or more first reception beams, such as the BFR procedure initiated at block 710 for the one or more first reception beams. In other words, a distinct BFR procedure may be initiated for the one or more second reception beams, i.e., a different BFR procedure than the one initiated for the one or more first reception beams, when the BFD procedure associated with the one or more second reference signals and one or more second reception beams detects a beam failure. Thus, in some aspects of the disclosure, two distinct BFD procedures may be initiated and performed by a mobile device in parallel. According to some aspects of the disclosure, one BFD procedure may be associated with the one or more first reference signals and one or more first reception beams, i.e., beams used for communication of broadcast and/or priority information, and another BFD procedure may be associated with the one or more second reference signals and one or more second reception beams, i.e., beams used for communication of unicast information.

In some aspects of the disclosure, the mobile device may not detect a failure in wireless communication performed using the one or more second reception beams during a time period in which the failure in wireless communication performed using the one or more first reception beams is detected. For example, in FIG. 7B, at block 702*d*, the mobile device may detect that a failure in wireless communication performed using the one or more first reception beams 704 has occurred based on the monitoring of the one or more first reference signals 706. At this time, BFR timer 712 is started. In some aspects of the disclosure, after the time that the BFR timer 712 is started and/or the time that failure in wireless communication performed using the one or more first reception beams is detected at block 702*d*, but before the BFR timer 712 expires or the mobile device receives an indication or other information from the base station at block 726, the mobile device may not detect a failure in wireless communication performed using the one or more second reception beams. For example, the mobile device, while monitoring the one or more second reference signals, may not detect that any of the one or more second reference signals has a signal power that is below the threshold, e.g., because wireless communication is reliable during this time period. As a result, the mobile device may refrain from initiating a BFR procedure for the one or more second reception beams during the time period in which the BFR procedure for the one or more first reception beams is initiated upon not detecting a failure in wireless communication performed using the one or more second reception beams during the time period in which the BFR procedure for the one or more first reception beams is initiated. In one aspect of the disclosure, the time period in which the BFR procedure for the one or more first reception beams is initiated may refer to the time period after the BFR timer 712 is started at block 710 and/or the time that failure in wireless communication performed using the one or more first reception beams is detected at block 702*d*, but before the BFR timer 712 expires or the mobile device receives an indication or other information from the base station at block 726.

As part of the BFR procedure, the mobile device may attempt to determine whether there are candidate beams that can be used to restore wireless communication. For example, in FIG. 7B, at block 764, the mobile device may also monitor the properties of one or more candidate reference signals associated with one or more candidate reception beams. At block 764, the mobile device may compare the signal power of at least one of the one or more candidate reference signals to a threshold, which may be the same or different than the threshold used as part of the monitoring of the one or more second reference signals. At block 772, the mobile device may determine that at least one of the one or more candidate reference signals has a signal power that is not below the threshold.

At block 774, as part of the BFR procedure, the mobile device may transmit to a base station, and the base station may receive from the mobile device, an indication of the failure in wireless communication performed using the one or more second reception beams. For example, the indication may be included in a report sent by the mobile device to the base station. In some aspects of the disclosure, the mobile device may transmit the foregoing beam failure indication to the base station using an uplink transmission beam of the mobile device. According to some aspects, the uplink transmission beam may be associated with one or more second reception beams, such as the one or more second reception beams described with respect to FIG. 6. For example, in some aspects, the uplink transmission beam may be a beam used for unicast wireless communication, e.g., a beam that is used for wireless communication associated with unicast control information relevant to only the mobile device. According to another aspect of the disclosure, the mobile device may transmit the indication to the base station in a physical uplink control channel (PUCCH)

allocated to the mobile device. In some aspects, at least one of frequency resources or time resources used to transmit the indication of the failure in wireless communication performed using the one or more second reception beams may be different than frequency resources or time resources used to transmit the indication of the failure in wireless communication performed using the one or more first reception beams. In other words, each transmission may have its own dedicated resources.

According to some aspects of the disclosure, at block 774, the mobile device may also transmit to the base station, and the base station may receive from the mobile device, along with the indication of the failure in wireless communication, an indication of one or more candidate beams that can be used for wireless communication in place of the one or more second reception beams. For example, the indication of one or more candidate beams that can be used for wireless communication in place of the one or more second reception beams may be included in the same report that includes the beam failure indication.

As illustrated in FIG. 7B, the indication of the failure in wireless communication performed using the one or more second reception beams transmitted by the mobile device to the base station, and received by the base station from the mobile device, may be different than the first indication of the failure in wireless communication performed using the one or more first reception beams transmitted by the mobile device to the base station, and received by the base station from the mobile device. In particular, as illustrated in FIG. 7B, both indications are transmitted/received as a result of two different and distinct BFD/BFR procedures. Thus, in some aspects of the disclosure, at the base station, there may be a time period 790 during which the base station may be processing two different reports regarding two different beam failure indications. Thus, the handling by the base station of the two different reports regarding two different beam failure indications, e.g., determining different reception beams to use in place of the different beams that resulted in different beam failure indications, may overlap during a time period 790.

At block 776, the mobile device may receive from a base station, and the base station may transmit to the mobile device, an indication of one or more other reception beams to use for wireless communication in place of the one or more second reception beams. In another aspect of the disclosure, at block 776, the mobile device may receive from the base station, and the base station may transmit to the mobile device, an indication to use the one or more candidate beams for wireless communication in place of the one or more second reception beams.

In some aspects of the disclosure, the mobile device may recover the wireless communication initially performed using the one or more second reception beams by using reception beams identified at block 776. For example, in one aspect of the disclosure, the mobile device may recover the wireless communication initially performed using the one or more second reception beams by using the one or more other reception beams for wireless communication in place of the one or more second reception beams. In another aspect of the disclosure, the mobile device may recover the wireless communication initially performed using the one or more second reception beams by using the one or more candidate beams for wireless communication in place of the one or more second reception beams.

At block 778, the mobile device may stop the BFR timer 762 upon receiving from the base station, such as at block 776, an indication of at least one beam that the mobile device can use to recover the failed wireless communication initially performed using the one or more second reception beams. At block 780, the mobile device may determine that a radio link failure (RLF) has occurred when the BFR timer 762 expires before the mobile device receives from the base station, such as at block 776, an indication of at least one beam that the mobile device can use to recover the failed wireless communication initially performed using the one or more second reception beams.

According to some aspects of the disclosure, the one or more first reference signals may be the same as the one or more second reference signals. In such aspects of the disclosure, the base station may reuse, and the mobile device may monitor, the same reference signals for the two different BFD/BFR processes, i.e., the BFD/BFR procedures performed based on reception and processing of the one or more first reception beams and their associated one or more first reference signals and the other BFD/BFR procedures performed based on reception and processing of the one or more second reception beams and their associated one or more second reference signals.

In other aspects of the disclosure, the one or more first reference signals may be a subset of the one or more second reference signals. In such aspects of the disclosure, the base station may reuse, and the mobile device may monitor, a subset of the one or more second reference signals to perform the BFD/BFR procedures performed based on reception and processing of the one or more first reception beams and their associated one or more first reference signals.

In some aspects of the disclosure, the frequency and/or time resources allocated for the one or more first reference signals may at least partially overlap with frequency and/or time resources allocated for the one or more second reference signals. For example, in one aspect of the disclosure, the one or more first reference signals and the one or more second reference signals may have overlapping frequency resources. In another aspect of the disclosure, the one or more first reference signals and the one or more second reference signals may have overlapping time resources. In yet another aspect of the disclosure, the one or more first reference signals and the one or more second reference signals may have overlapping frequency and time resources.

According to some aspects, the configuration of one or more first reference signals, one or more second reference signals, and different RSRP thresholds may be signaled to a mobile device from a base station. For example, in some aspects, a mobile device may receive a configuration for at least one of one or more first reference signals, one or more second reference signals, and different RSRP thresholds from a base station.

Figure 8:
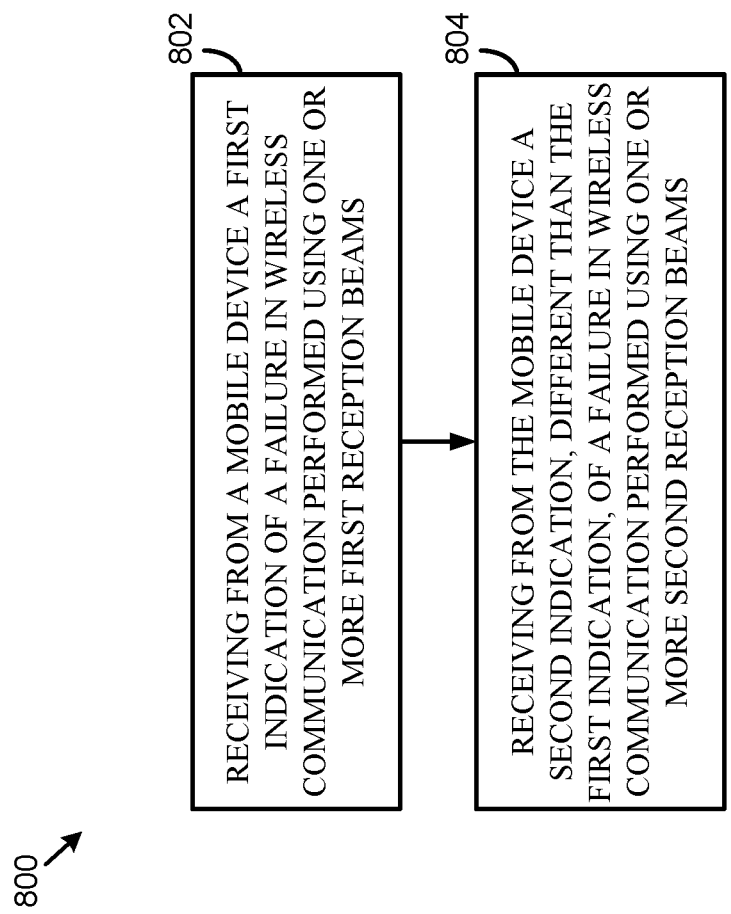
FIG. 8 is a block diagram illustrating a method for performing beam failure detection and recovery for high priority or broadcast CORESETs in a wireless communication system according to some aspects of the present disclosure.

FIG. 8 is a block diagram illustrating a method for performing beam failure detection and recovery for high priority or broadcast CORESETs in a wireless communication system according to some aspects of the present disclosure. Aspects of method 800 may be implemented with the aspects of this disclosure described with respect to FIGS. 1-5, 7A, and 7B. For example, with reference to FIG. 2, controller/processor 240 of base station 105 may control base station 105 to perform the steps of method 800. Specifically, method 800 includes, at block 802, the step of receiving, by a processor, from a mobile device, a first indication of a failure in wireless communication performed using one or more first reception beams. For example, with reference back to FIGS. 7A and 7B, at block 724, as part of the BFR procedure, the base station may receive from the mobile device an indication of the failure in wireless communication performed using the one or more first reception beams 704.

At block 804, method 800 includes the step of receiving, by the processor, from the mobile device, a second indication, different than the first indication, of a failure in wireless communication performed using one or more second reception beams. For example, with reference back to FIG. 7B, at block 774, as part of the BFR procedure, the base station may receive from the mobile device an indication of the failure in wireless communication performed using the one or more second reception beams.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a processor of a user equipment (UE), the method comprising:

monitoring one or more first reference signals associated with the wireless communication performed using one or more first reception beams;

monitoring one or more second reference signals associated with the wireless communication performed using one or more second reception beams;

initiating a first beam failure recovery procedure for the one or more first reception beams in response to detecting failure in the wireless communication performed using the one or more first reception beams; and initiating a second beam failure recovery procedure for the one or more second reception beams in response to detecting the failure in the wireless communication performed using the one or more second reception beams, wherein:

the wireless communication performed using the one or more first reception beams comprises reception of broadcast control information relevant to more than one mobile device, the wireless communication performed using the one or more second reception beams comprises reception of unicast control information relevant to a single mobile device, and the first beam failure recovery procedure is distinct from the second beam failure recovery procedure, the first beam failure recovery procedure adapted for the one or more first reception beams for the reception of the broadcast control information, and the second beam failure recovery procedure adapted for the one or more second reception beams for the reception of the unicast control information.

2. The method of claim 1, further comprising:

refraining from initiating the second beam failure recovery procedure for the one or more second reception beams during a time period in which the first beam failure recovery procedure for the one or more first reception beams is initiated upon not detecting a failure in the wireless communication performed using the one or more second reception beams during the time period in which the first beam failure recovery procedure for the one or more first reception beams is initiated.

3. The method of claim 1, further comprising:

detecting a first failure in the wireless communication performed using the one or more first reception beams based, at least in part, on the monitoring of the one or more first reference signals;

detecting a second failure in the wireless communication performed using the one or more second reception beams based, at least in part, on the monitoring of the one or more second reference signals, wherein the second beam failure recovery procedure for the one or more second reception beams is initiated in addition to the initiation of the first beam failure recovery procedure for the one or more first reception beams.

4. The method of claim 3, further comprising:

transmitting, to a base station, a first indication of the failure in the wireless communication performed using the one or more second reception beams, wherein at least one of frequency resources or time resources used to transmit the first indication of the failure in the wireless communication performed using the one or more second reception beams is different than frequency resources or time resources used to transmit a second indication of the failure in the wireless communication performed using the one or more first reception beams.

5. The method of claim 1, wherein the one or more first reception beams and the one or more second reception beams are associated with different control resource sets.

6. The method of claim 1, wherein the one or more first reception beams have the same frequency and time resources as the one or more second reception beams.

7. The method of claim 1, wherein the one or more first reference signals are the same as the one or more second reference signals.

8. The method of claim 1, wherein the one or more first reference signals are a subset of the one or more second reference signals.

9. The method of claim 1, wherein frequency resources, time resources, or a combination thereof allocated for the one or more first reference signals at least partially overlap with frequency resources, time resources, or both allocated for the one or more second reference signals.

10. The method of claim 1, further comprising:

transmitting an indication of the failure in the wireless communication performed using the one or more first reception beams to a base station.

11. The method of claim 10, wherein transmitting the indication of the failure in the wireless communication performed using the one or more first reception beams to the base station comprises transmitting the indication using a transmission beam used for the wireless communication associated with unicast control information relevant to a single mobile device.

12. The method of claim 10, wherein transmitting the indication of the failure in the wireless communication performed using the one or more first reception beams to the base station comprises transmitting the indication in a physical uplink control channel (PUCCH).

13. The method of claim 10, further comprising:

transmitting, along with the indication of the failure in the wireless communication, a second indication of one or more candidate beams that can be used for the wireless communication in place of the one or more first reception beams; and receiving at least one of:

a third indication of one or more other reception beams to use for the wireless communication in place of the one or more first reception beams; or a fourth indication to use the one or more candidate beams for the wireless communication in place of the one or more first reception beams.

14. The method of claim 10, further comprising:

receiving a second indication to use at least one of the one or more second reception beams for the wireless communication in place of the one or more first reception beams, wherein the indicated at least one of the one or more second reception beams are used to recover the wireless communication associated with the one or more first reception beams before expiration of a timer associated with the beam failure recovery procedure for the one or more first reception beams.

15. The method of claim 1, wherein the wireless communication performed using the one or more first reception beams comprises the wireless communication within a first BWP, and wherein the wireless communication performed using the one or more second reception beams also comprises the wireless communication within the first BWP.

16. The method of claim 1, wherein the first beam failure recovery procedure is performed independently of the second beam failure recovery procedure, and wherein the broadcast control information comprises high priority information.

17. The method of claim 1, wherein the second beam failure recovery procedure for the one or more second reception beams is initiated in addition to the initiation of the first beam failure recovery procedure for the one or more first reception beams.

18. An apparatus configured for wireless communication, the apparatus comprising:
- at least one processor; and
- a memory coupled to the at least one processor,
- wherein the at least one processor is configured to:
  - monitor one or more first reference signals associated with the wireless communication performed using one or more first reception beams;
  - monitor one or more second reference signals associated with the wireless communication performed using one or more second reception beams;
    - initiate a first beam failure recovery procedure for the one or more first reception beams in response to detection of the failure in the wireless communication performed using the one or more first reception beams; and
  - initiate a second beam failure recovery procedure for the one or more second reception beams in response to detection of the failure in the wireless communication performed using the one or more second reception beams, wherein:
  - the wireless communication performed using the one or more first reception beams comprises reception of broadcast control information relevant to more than one mobile device,
  - the wireless communication performed using the one or more second reception beams comprises reception of unicast control information relevant to a single mobile device, and
  - the first beam failure recovery procedure is distinct from the second beam failure recovery procedure, the first beam failure recovery procedure adapted for the one or more first reception beams for the reception of the broadcast control information, and the second beam failure recovery procedure adapted for the one or more second reception beams for the reception of the unicast control information.

19. The apparatus of claim 18, wherein the at least one processor is further configured to:
- refrain from initiating the second beam failure recovery procedure for the one or more second reception beams during a time period in which the first beam failure recovery procedure for the one or more first reception beams is initiated upon not detecting a failure in the wireless communication performed using the one or more second reception beams during the time period in which the first beam failure recovery procedure for the one or more first reception beams is initiated.

20. The apparatus of claim 18, wherein the at least one processor is further configured to:
- detect a first failure in the wireless communication performed using the one or more first reception beams based, at least in part, on the monitoring of the one or more first reference signals;
- detect a second failure in the wireless communication performed using the one or more second reception beams based, at least in part, on the monitoring of the one or more second reference signals, wherein the second beam failure recovery procedure for the one or more second reception beams is initiated in addition to the initiation of the first beam failure recovery procedure for the one or more first reception beams.

21. The apparatus of claim 18, wherein the at least one processor is further configured to:
- transmit an indication of the failure in the wireless communication performed using the one or more first reception beams to a base station.

22. The apparatus of claim 21, wherein the at least one processor is further configured to:
- transmit, along with the indication of the failure in the wireless communication, a second indication of one or more candidate beams that can be used for the wireless communication in place of the one or more first reception beams; and
- receive at least one of:
  - a third indication of one or more other reception beams to use for the wireless communication in place of the one or more first reception beams; or
  - a fourth indication to use the one or more candidate beams for the wireless communication in place of the one or more first reception beams.

23. The apparatus of claim 21, wherein the at least one processor is further configured to:
- receive a second indication to use at least one of the one or more second reception beams for the wireless communication in place of the one or more first reception beams, wherein the indicated at least one of the one or more second reception beams are used to recover the wireless communication associated with the one or more first reception beams before expiration of a timer associated with the beam failure recovery procedure for the one or more first reception beams.

24. A method of wireless communication performed by a processor, the method comprising:
- receiving, from a mobile device, a first indication of a failure in the wireless communication performed using one or more first reception beams; and
- receiving, from the mobile device, a second indication, different than the first indication, of a failure in the wireless communication performed using one or more second reception beams, wherein:
  - the wireless communication performed using the one or more first reception beams comprises communication associated with broadcast control information relevant to more than one mobile device,
  - the wireless communication performed using the one or more second reception beams comprises communication associated with unicast control information relevant to only the mobile device,
  - the first indication of the failure is received in response to a first beam failure recovery procedure, performed by the mobile device and adapted for the one or more first reception beams for the reception of the broadcast control information, and
  - the second indication of the failure is received in response to a second beam failure recovery procedure, distinct from the first beam failure recovery procedure, performed by the mobile device, and adapted for the one or more second reception beams for the reception of the unicast control information.

25. The method of claim 24, further comprising:
- receiving, along with the first indication of the failure in the wireless communication performed using the one or more first reception beams, a third indication of one or more candidate beams that can be used for the wireless communication in place of the one or more first reception beams; and
- transmitting at least one of:

a fourth indication of one or more other reception beams to use for the wireless communication in place of the one or more first reception beams; or a fifth indication to use the one or more candidate beams for the wireless communication in place of the one or more first reception beams.

26. The method of claim 24, further comprising:

transmitting a third indication to use at least one of the one or more second reception beams for the wireless communication in place of the one or more first reception beams.

27. The method of claim 24, wherein the wireless communication performed using the one or more first reception beams comprises the wireless communication within a first BWP, and wherein the wireless communication performed using the one or more second reception beams also comprises the wireless communication within the first BWP.

28. An apparatus configured for wireless communication, the apparatus comprising:

at least one processor; and a memory coupled to the at least one processor, wherein the at least one processor is configured to:

receive, from a mobile device, a first indication of a failure in the wireless communication performed using one or more first reception beams; and receive, from the mobile device, a second indication, different than the first indication, of a failure in the wireless communication performed using one or more second reception beams, wherein:

the wireless communication performed using the one or more first reception beams comprises communication associated with broadcast control information relevant to more than one mobile device, the wireless communication performed using the one or more second reception beams comprises communication associated with unicast control information relevant to only the mobile device, the first indication of the failure is received in response to a first beam failure recovery procedure, performed by the mobile device and adapted for the one or more first reception beams for the reception of the broadcast control information, and the second indication of the failure is received in response to a second beam failure recovery procedure, distinct from the first beam failure recovery procedure, performed by the mobile device, and adapted for the one or more second reception beams for the reception of the unicast control information.

29. The apparatus of claim 28, wherein the at least one processor is further configured to:

receive, along with the first indication of the failure in the wireless communication performed using the one or more first reception beams, a third indication of one or more candidate beams that can be used for the wireless communication in place of the one or more first reception beams; and transmit at least one of:

a fourth indication of one or more other reception beams to use for the wireless communication in place of the one or more first reception beams; or a fifth indication to use the one or more candidate beams for the wireless communication in place of the one or more first reception beams.

30. The apparatus of claim 28, wherein the at least one processor is further configured to:

transmit a third indication to use at least one of the one or more second reception beams for the wireless communication in place of the one or more first reception beams.

* * * * *